United States Patent [19]
Schuermann et al.

[11] Patent Number: 5,489,757
[45] Date of Patent: Feb. 6, 1996

[54] PROCESS FOR RESISTANCE WELDING ARRANGEMENT FOR CARRYING OUT THE PROCESS

[75] Inventors: Hubert Schuermann, Rudolfstetten; Werner Sutter, Oberehrendingen; Markus Weber, Spreitenbach, all of Switzerland

[73] Assignee: Elpatronic AG, Zug, Switzerland

[21] Appl. No.: 845,057

[22] Filed: Mar. 3, 1992

[30] Foreign Application Priority Data

| Mar. 6, 1991 | [CH] | Switzerland | 676/91 |
| Apr. 22, 1991 | [DE] | Germany | 41 13 117.7 |
| Nov. 22, 1991 | [CH] | Switzerland | 3435/91 |
| Nov. 22, 1991 | [CH] | Switzerland | 3436/91 |

[51] Int. Cl.$^6$ .................................................. B23K 11/24
[52] U.S. Cl. ........................................ 219/110; 219/64
[58] Field of Search ........................... 219/108, 110, 219/64

[56] References Cited

U.S. PATENT DOCUMENTS

| 4,414,455 | 11/1983 | Schneider et al. | 219/108 |
| 4,521,671 | 6/1985 | Fronius . | |
| 4,521,672 | 6/1985 | Fronius . | |
| 4,554,430 | 11/1985 | Belamaric | 219/108 |
| 4,654,503 | 3/1987 | Tajiri | 219/110 |
| 5,237,147 | 8/1993 | Pazzaglia | 219/108 |

FOREIGN PATENT DOCUMENTS

| 0261328 | 7/1987 | European Pat. Off. . |
| 260963 | 9/1987 | European Pat. Off. . |
| 0078252 | 12/1987 | European Pat. Off. . |
| 2023825 | 11/1970 | Germany . |
| 3005083 | 2/1980 | Germany . |
| 56-125586 | 8/1981 | Japan . |
| 60-39293 | 2/1985 | Japan . |
| 63-61313 | 5/1988 | Japan . |
| 63-124246 | 5/1988 | Japan . |
| 1-204604 | 8/1989 | Japan . |
| 668842 | 6/1982 | Switzerland . |

OTHER PUBLICATIONS

Soudronic publication "Elektrisches Widerstandsschweissen" MDI 00188 D, pp. 9 and 10.
Zeitung mit Informationen rund um Soudronic, 1st year publication, No. 1, Jun. 1985 (p. 3).

*Primary Examiner*—Clifford C. Shaw

[57] ABSTRACT

A process and apparatus for resistance-welding produce a welding current which pulsates in periodic half-waves, in particular an alternating current. The, welding current is generated from a primary alternating voltage which is chopped n times (n>1) in each half-wave and pulse width modulated in order to regulate the welding current. A regulator is provided and has a storage device containing the current nominal values for each chopping interval, corresponding to the welding current form, for comparison with each actual current value determined in each chopping interval.

31 Claims, 15 Drawing Sheets

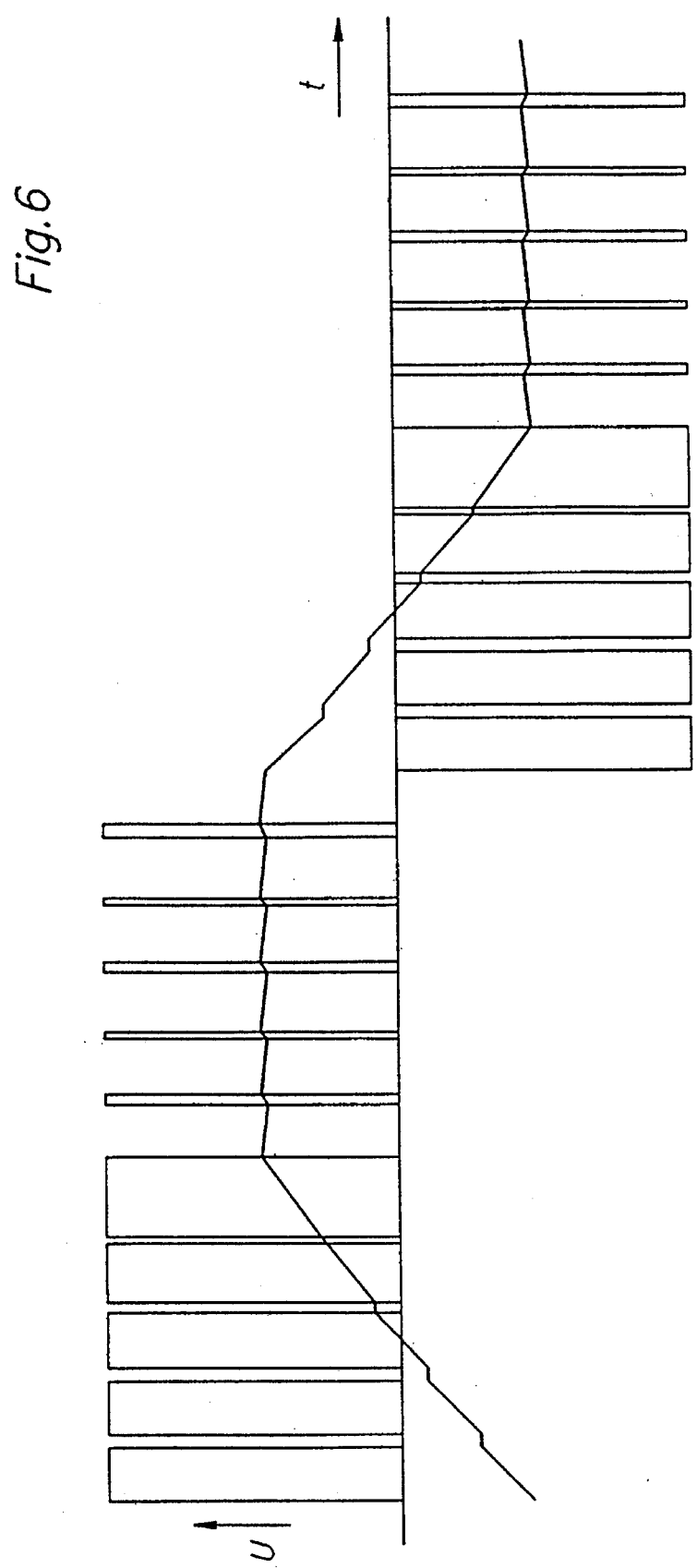

35°

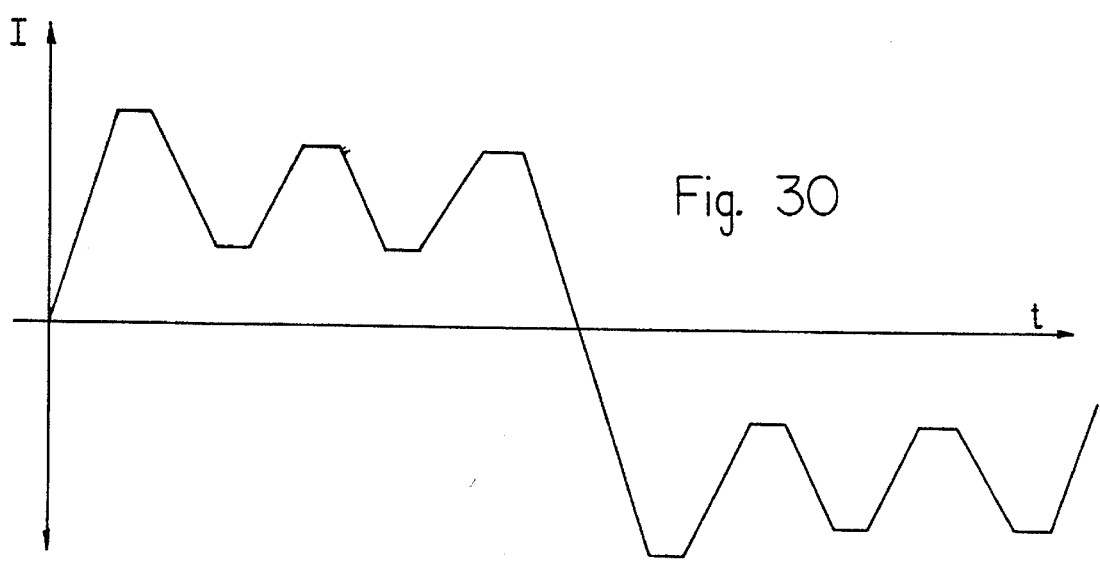

PROCESS FOR RESISTANCE WELDING ARRANGEMENT FOR CARRYING OUT THE PROCESS

BACKGROUND OF THE INVENTION

The invention relates to a process for resistance welding with a welding current which pulsates in periodic half-waves, in particular an alternating current, and which is generated from a primary alternating voltage and is controlled by pulse duration modulation thereof.

The invention furthermore relates to an arrangement for carrying out the process, having a static frequency changer, which has a direct current intermediate circuit and, as an output stage, has a chopper which generates the primary alternating voltage and transmits it to the welding transformer whose secondary circuit is connected to welding electrodes of a resistance welding machine.

Such a process and such an arrangement are known from EP-A2-0 260 963, which will be discussed in greater detail hereafter.

In one known seam-welding device (EP-A1-0 261 328) for the resistance-longitudinal seam welding of the overlapped edges of bodies for conserve cans and the like, a three-phase mains alternating voltage is converted into a direct current voltage, which is smoothed and converted into an impulse voltage with an alternating polarity. This impulse voltage is applied to the welding electrodes of the seam-welding device. The frequency of the impulse voltage is so selected, that the resulting welding current is continuous and for this reason the individual welding nuggets or spots, which in each case are created by one of the rectangular half-waves of the impulse voltage, overlap each other. As each welding current half-wave is generated by a half-wave of the impulse voltage, the welding current form is dependent upon the duration of the impulse voltage half-waves. If, when regulating the welding current, this impulse duration is varied during a half-wave, this leads to a considerable variation in the welding current form, which must be regarded as disadvantageous. It would be considerably more advantageous if the welding current form were not dependent on and therefore not determined by machine parameters, but could be preselected for optimizing the welding result.

Furthermore, in the known seam-welding device the welding current regulator, which controls the current per welding spot, operates in each case with the measured value of the preceding welding spot. The reaction time of the regulator, also determined by a correction device which is controlled by the latter, is therefore relatively long (with a welding frequency of 500 Hz, the reaction time reaches 1 ms). As a result, the regulator is not in a position to correct rapid variations of the welding parameters (e.g. for a contaminated sheet metal surface). In order to improve the regulating ability of this known seam-welding device, the regulator reaction time would therefore require to be shortened. To this end, the switching frequency could conceivably be increased by a certain factor. However, the frequency of the welding current would also be increased by this factor as a result. In consequence of the strongly inductive load of the seam-welding device, because the impedance would increase proportionally to the frequency, the welding current is reduced by a factor which would be equal to the reciprocal of the factor by which the switching frequency would have been increased. In order to compensate this, the voltage and the power of the frequency changer and the welding transformer of the known seam-welding device would have to be increased by the same factor by which the switching frequency was increased. Additionally, the requirement that the welding frequency should stand in a certain ratio to the welding speed, would no longer be fulfilled. In this known seam-welding device, because of the long regulator reaction time welding parameters, such as for example the contact resistance at the welding point (surface quality of the welding material), material properties of the welding material etc., cannot be sufficiently rapidly taken into account and there is also no possibility of adapting the welding current form to different welding conditions, e.g. to the requirements of the different materials being processed.

The hereinbefore mentioned EP-A2-0 260 963 proposes that a current source of high frequency be used, in order to make it possible to use a smaller welding transformer. As this causes problems with the necessary phase control of thyristors, a feed-forward or forward control of the welding current is operated, by using in a half-wave during the phase control a pre-calculated value which has been calculated beforehand on the basis of the measured value for the preceding half-wave. The arrangement which is known from this publication also does not operate satisfactorily in all working conditions as the welding current is likewise switched on and off only once per welding spot. As here also the regulator in each case operates with the measured value of the preceding welding spot, the reaction time of the regulator is relatively long. If the pulse length is varied during the pulse length modulation, the welding current form also varies, for which reason the latter cannot be adapted to a special material or to special operating conditions.

Common to both already known arrangements, moreover, is the fact that only the quadratic mean value of the welding current is measured as its actual value and therefore only the mean value of the welding current can be controlled. For this reason, a constant mean value of the welding current is preset as a nominal value.

From CH-A5-668 842 is known a device for the stepless control of the amplitude of a sinusoidal electric alternating current. In each half-wave of the alternating current, over a variable part thereof, controllable circuit elements can be moved from the blocking state into the transmitting state. Certainly, a type of electronically controllable adjustable transformer is provided thereby which is practically delay-free, but here also the possibility of influencing the welding current is limited to one switching procedure per half-wave thereof. For this reason, no more rapid regulating times can be obtained in this case also.

DE-C2-30 05 083 describes a process for the manufacture of longitudinal seam-welded rounded bodies in which, in order to obtain a continuous unbroken welding seam, the duration of one half-wave of the almost rectangular welding current is adapted to the time for conveying a body between the welding electrode rolls and the energy required during the welding operation can thereby be directly controlled by superimposing on the welding current a high-frequency current component. The possibility of regulation by superimposing a high-frequency current component is naturally limited, not only with regard to the regulating range but also the regulating time.

Finally, the specialist is familiar, for example, from the Soudronic publication "Electric Resistance-welding" MDI 00188 D, Pages 9 and 10, with varying the welding current strength by means of a phase-shifting control. Unfortunately, the welding current form also varies in each case. The same applies if the welding current is kept constant with varying load conditions, as in both cases the phase-shifting angel has to be varied. Moreover, the phase-shifting control of the primary alternating voltage of a welding transformer produces an interrupted welding current which is likewise disadvantageous.

SUMMARY OF THE INVENTION

The problem of the invention is to provide a process and an arrangement for performing the process of the type hereinbefore mentioned, by means of which the welding current form can easily be adapted to the requirements of the different materials being processed. Furthermore, the process and the arrangement are intended to be suitable for the rapid regulation of the welding current, so far as regulation is provided for.

This problem is solved according to the invention, originating from a process of the type hereinbefore mentioned, in that the primary alternating voltage is chopped with a chopping frequency in each half-wave during the pulse length modulation, which frequency is a multiple of the welding current frequency, in order to produce a certain welding current form.

Originating from an arrangement of the type hereinbefore mentioned, this problem is furthermore solved according to the invention using a control device by means of which the chopper can be controlled for multiple chopping of the primary alternating voltage.

Whilst therefore in the prior art set out above, the primary alternating voltage is chopped only once in each half-wave during the pulse length modulation, according to the invention, it is chopped n times, where n is >1. A short regulating time can be obtained thereby if, as is preferable, regulation is carried out, because several nominal-actual comparisons of the welding current can be performed in each half-wave and the duty ratio can accordingly be repeatedly influenced during the pulse length modulation. As the chopping frequency is accordingly a multiple of the frequency of the welding current, rapid regulation is obtained over the course of each welding spot. This enables the regulator to correct rapid variations of the welding parameters (e.g. from a contaminated sheet-metal surface). The form of the impulses into which the primary alternating voltage is chopped in each half-wave approximates to a rectangle. The duty ratio, i.e. the impulse length/impulse interval can be varied within wide limits. The mean value of the primary alternating voltage can thereby be directly influenced, and the current form can be preset as desired, and therefore variably formed, which is impossible in the prior art. There, as explained above, it is influenced by the system (e.g. during phase-shift control) or is fixed. Whereas the chopping frequency in the prior art expounded above is either fixed (e.g. during the phase-shift control) or is at most equal to the welding frequency, it is a multiple of the welding frequency in the process and the arrangement according to the invention. The advantage of simple selection of a desired welding current form can however also be produced without regulation, by a simple control of the chopping. Regulation is nevertheless preferred.

In one preferred arrangement the storage device contains at least n nominal values per half-wave of the welding current curve, which during regulation of the welding current are compared with each of the n current actual values determined per half-wave, in order to obtain a setting value with which the duty ratio can be influenced during the pulse length modulation.

The process and the arrangement therefore offer the following advantages, more especially with the preferred specific embodiments:

the welding frequency is variable, and the chopping frequency is a selectable multiple of the welding frequency;

the current form is preselectable, and therefore variable, and is not substantially altered by the modification of the duty ratio during regulation of the welding current;

if the preselected welding current form is not to be maintained during operation, the current form is correspondingly corrected by the regulating procedure, i.e. by the influence on the duty ratio;

the welding current form held in the store can be selected according to requirements, i.e. as a triangular, sinusoidal or trapezoidal form, e.g. trapezoidal with sloping impulse top or trapezoidal with humps or dips (depending upon the desired heat energy balance within one welding spot, the better the heating phase and the cooling phase within one welding spot can be controlled, the better the welding operating can be controlled, so well that, with the aid of the invention, materials which previously were not considered to be weldable, such as, for example, chromium plated parts, can now be welded);

the reaction time of the regulator is considerably shorter than in the prior art, because welding occurs n times within one half-wave and the current is readjusted in each instance.

These advantages are obtained by the high chopping frequency, which according to the invention, is selected to correspond to a multiple of the welding frequency.

Advantageous developments of the invention constitute the subject-matter of the subsidiary claims.

In one development of the invention, a welding frequency of 500 Hz, a chopping frequency of 10 kHz is produced. This chopping frequency is fixedly preselected and then remains unaltered. Simply the duty ratio is altered during the regulation of the welding current. In the development of the invention, each half-wave of the primary alternating voltage is chopped ten times.

In another development of the invention, each welding current form is laid down in a selectable nominal value table. Thus, for example, one nominal value table is stored for a sinusoidal current form, one for a triangular current form, and one for a trapezoidal current form, etc.

In another development of the invention, the regulating process according to the invention can be realized most easily, as the transistors used as circuit elements have particularly short switching times.

In further developments of the invention, a special sub-table or nominal value table is available for each welding current form and/or frequency. Consequently, more nominal values per half-wave are available for lower welding frequencies than for higher welding frequencies.

In another development of the invention, the short reaction times of the regulator can be particularly well utilized, as the current nominal values and the respective variations between adjacent current nominal values can be conveniently calculated in advance and stored in the table. The first derivative of the welding current curve is preferably stored as a variation between adjacent current nominal values. This brings with it the advantage that regulation can occur in anticipation, i.e. overshooting during the regulating process can substantially be avoided from the outset, because on account of the stored variation it is known in advance where the next current nominal value is placed.

In further developments of the invention, a desired amplitude of the welding current can be obtained in a simple way by multiplying the stored nominal values of the table by a corresponding factor which can be fed in as required.

The invention relates further to a process for resistance-welding with a current pulsating in periodic half-waves, more especially an alternating welding current. Hitherto, such welding has taken place with a sinusoidal current. In tin plate welding, problems arise increasingly with the welding of very thin metal plates and/or very slightly tin-plated metal plates. Particularly in the welding of cans (tin plate containers), such metal sheets can lead to problems the production technology of which is difficult to control. The same applies to the welding of black plate and also specially coated metal sheets, more particularly chromium-plated metal sheets. Up to now, it has been attempted, by different welding current amplitudes and welding current frequencies of the sinusoidal welding current, to overcome these problems, but the results have often remained unsatisfactory.

The problem underlying the invention, therefore, is to make possible the welding of thin and/or slightly tin-plated metal sheets and other metal sheets. Within a very narrow tolerance band width, an energy supply during welding is intended to be made possible in particular, in order to avoid spatter (too high energy supply) or gaps in the overlap (too low energy supply).

According to the invention, this is achieved in the process hereinbefore mentioned, in that the welding current deviates from the sine profile.

Because the individual half-waves of the welding current can have any profile, the exactly necessary energy supply to the welding location for optimal welding is made possible. Through the course of the current, the necessary heating-up and cooling-down of the welding location in order to provide the required electrical resistance at the welding location can be made very finely controllable, which has been impossible up to now.

BRIEF DESCRIPTION OF THE DRAWINGS

Exemplified embodiments of the invention are described in greater detail hereafter with reference to the drawings.

FIG. 6 shows a third example of a pulse length modulated primary alternating voltage with which a trapezoidal welding current is produced, FIGS. 10 to 30 show preferred current profiles.

DESCRIPTION OF THE PREFERRED EMBODIMENTS

Figure 1:
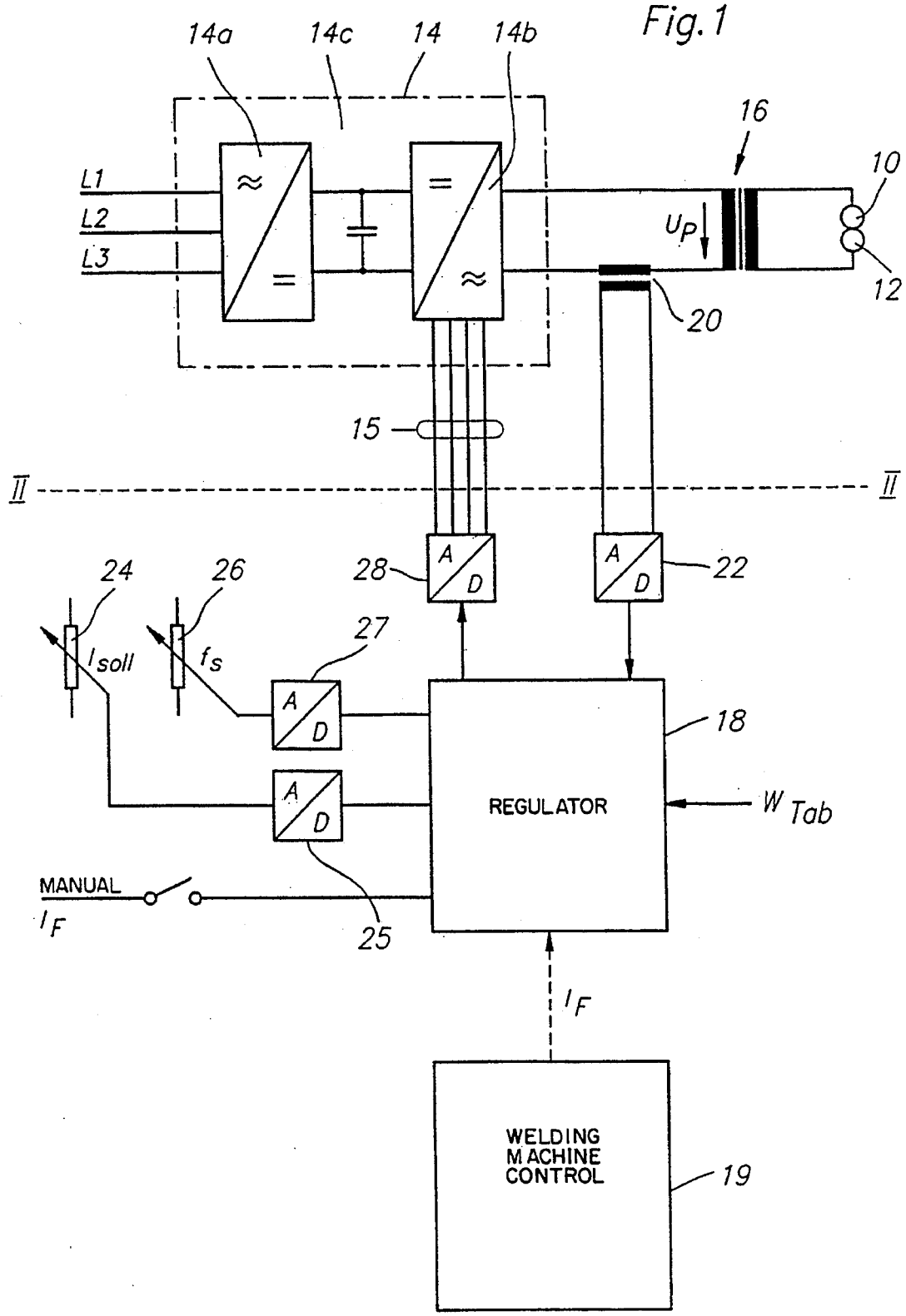
FIG. 1 shows a circuit diagram of a resistance seam-welding machine with an arrangement according to the invention for regulating the welding current.

FIG. 1 shows a simplified circuit diagram of a resistance seam-welding machine for the longitudinal seam-welding of unillustrated rounded can bodies between roller-like welding electrodes 10 and 12. The resistance seam-welding machine has a static frequency changer 14 which is powered form a mains supply which is indicated by lines L1–L3, and has an input stage 14a which is connected via a conventional direct current intermediate circuit 14c to an output stage 14b which is designed as a chopper. The output stage 14b is connected to the primary circuit of a welding current transformer 16, to which it delivers a primary alternating voltage $U_p$. The secondary circuit of the welding transformer 16 is connected to the welding electrodes 10 and 12.

Figure 2:
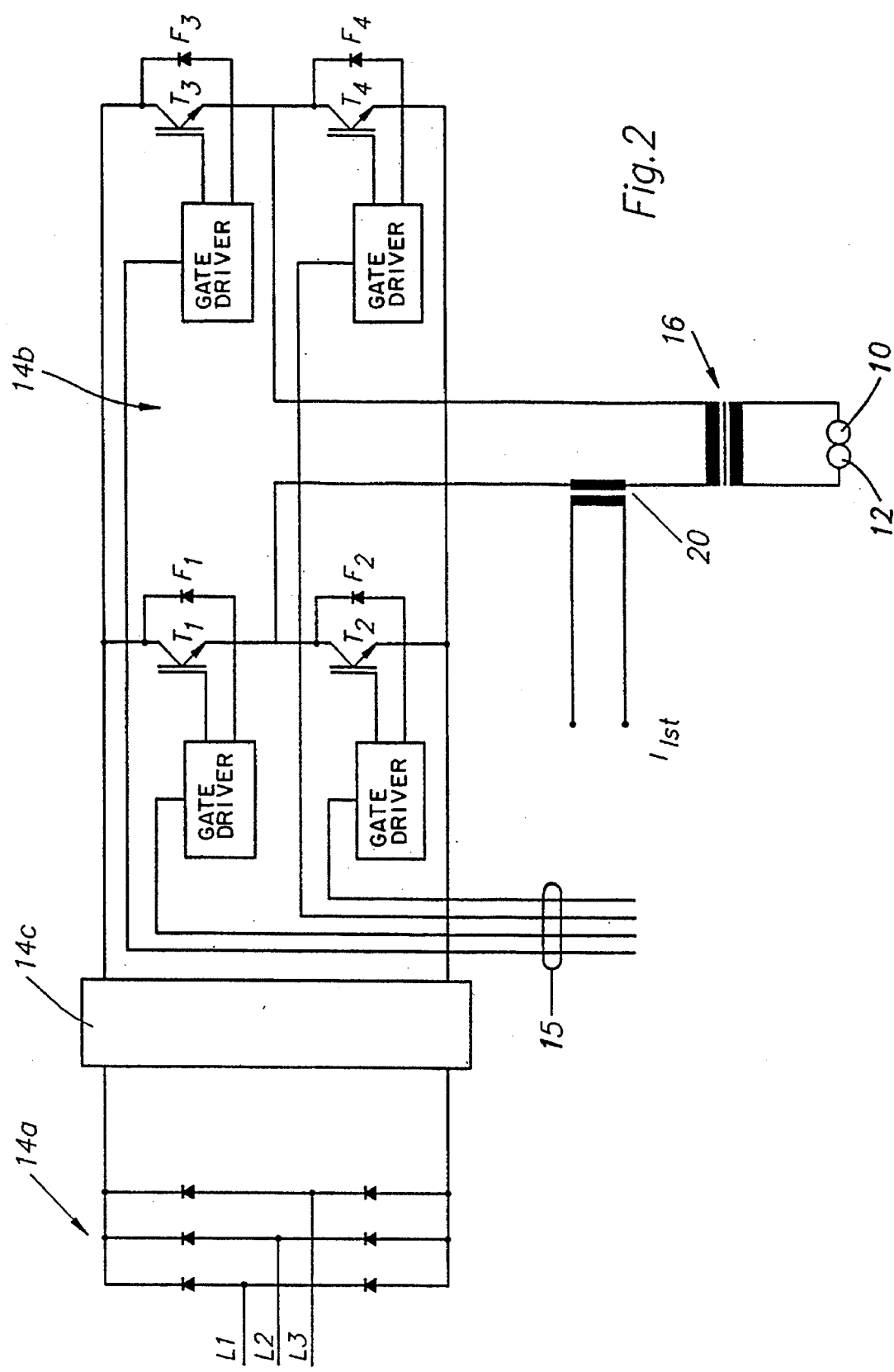
FIG. 2 shows a more detailed diagram of the part of the arrangement according to the invention which is illustrated above a line II—II in FIG. 1.

According to the expanded diagram in FIG. 2, the input stage 14a of the static frequency changer 14 has a three-phase rectifier, which at the same time forms the input of the direct current intermediate circuit 14c which is generally known and does not need to be described in greater detail here as it is unimportant for the circumstances of the invention. As FIG. 2 shows, the chopper in the output stage 14b of the frequency changer 14 (FIG. 1) contains abridge circuit with transistors $T_1$–$T_4$ as switching elements and freewheel diodes $F_1$–$F_4$ in parallel with the transistors. Four gate drivers are connected in the way illustrated in FIG. 2 to the transistors and freewheel diodes and are controlled by a regulator 18 (FIG. 1) via lines 15. In the primary circuit of the welding transformer 16 is arranged a current transformer 20, which detects the actual value of the current flowing in the primary circuit of the welding transformer 16.

As already mentioned, important advantages of the invention can be obtained even with a simple control system which creates the desired duty ratio for the desired current form. But as the invention really makes rapid regulation possible for the first time, the explanation will be made hereafter with reference to regulation.

According to the diagram in FIG. 1, the current actual value from the current transformer 20 is delivered via an A/D converter 22 to an input of the regulator 18, which is designed as a process computer. On the regulator 18, nominal values $I_{Soll}$ for the welding current or $f_S$ for the welding frequency can be set via potentiometers 24 and 26. The analogue voltages which are set on the potentiometers 24 and 26 are applied via A/D converter 25 or 27 to the process computer. A welding current supply magnitude $I_F$ can additionally be fed into the regulator 18 via an input marked with MANUAL or via a welding machine control system 19. This magnitude is linked to the nominal welding current $I_{Soll}$ in order for example to allow for the fact that the current over a can body is not constant. Thus, the welding machine control system 19, which knows exactly where the welded can body is at each point in time, can also vary the set nominal value $I_{Soll}$ accordingly, so that welding occurs at each point of the can body with a suitable welding current amplitude. The regulator 18 determines through a nominal-actual comparison of the welding current a setting value, which it delivers via an A/D converter 28 and the lines 15 to the gate drivers (FIG. 2) in the output stage 14b of the frequency changer 14 (FIG. 1). The setting value influences the duty ratio of the rectangular impulses into which the chopper in the output stage 14b chops the smoothed direct current voltage from the direct current intermediate circuit 14c in each half-wave, in order by this means to regulate the welding current by pulse length modulation of the primary alternating voltage with that affected duty ratio, as is described in greater detail hereafter with reference to FIG. 3.

Figure 4:
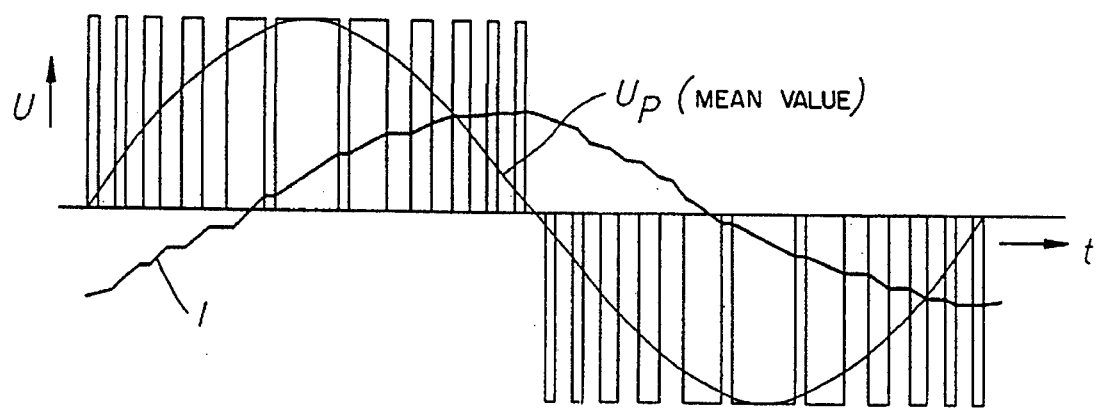
FIG. 4 shows a first example of a pulse length modulated primary alternating voltage of a welding transformer and of an occurring sinusoidal welding current.
Figure 5:
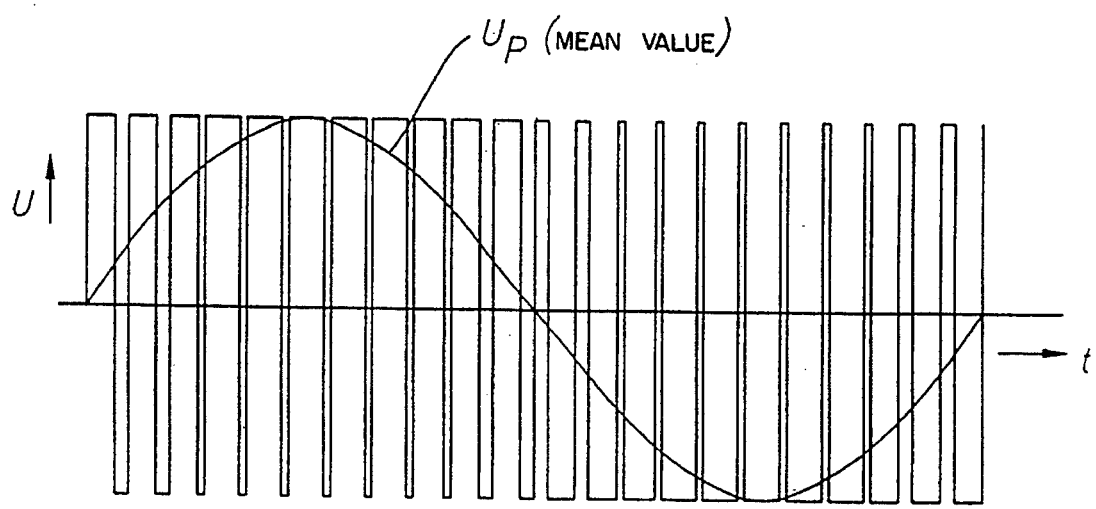
FIG. 5 shows a second example of a pulse length modulated primary alternating voltage, which is chopped in a different way from in FIG. 4.

Various ways of generating the primary alternating voltage by chopping the smoothed direct current voltage into rectangular impulses are illustrated in FIGS. 4–6. In the example in FIG. 4 the smoothed direct current voltage is chopped into rectangular impulses with a polarity which changes from half-wave to half-wave, such that in the mean a sinusoidal primary alternating voltage $U_p$ and hence a substantially sine form of the welding current I is produced.

The same applies to the example of FIG. 5, in which the smoothed direct current voltage is chopped into rectangular impulses of equal height, which in each case is equal to twice the peak value of the primary alternating voltage $U_p$ which is sinusoidal in the mean.

In the example according to FIG. 6, the chopping of the smoothed direct current voltage occurs according to the same principles as in FIG. 4, but in such a way that a trapezoidal welding current I is produced.

Figure 3:
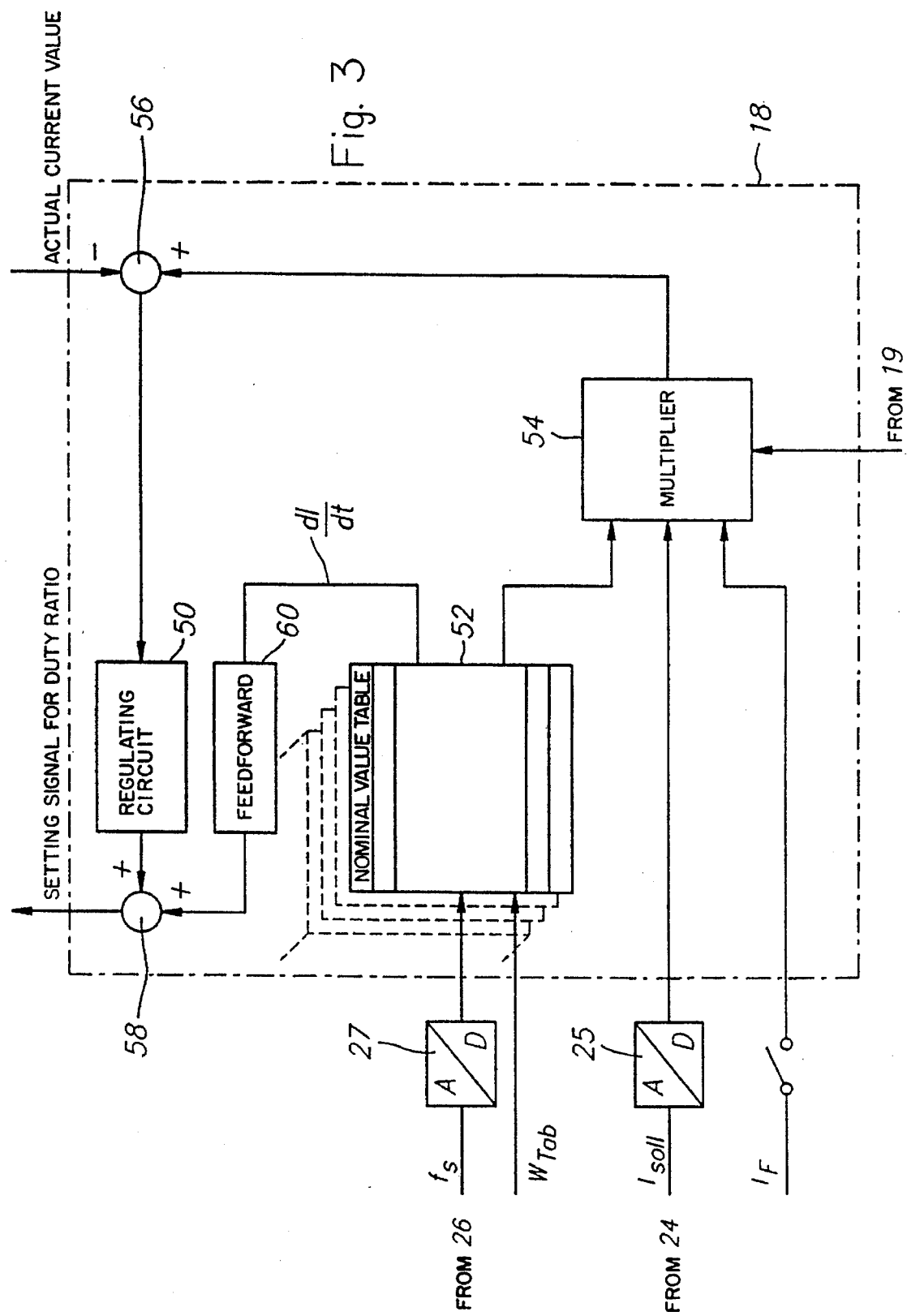
FIG. 3 shows a more detailed diagram of a regulator which is illustrated as a block in FIG. 1.

The regulator 18 is illustrated more fully in FIG. 3. The regulator 18, as mentioned already above, is designed as a process computer, of which only the parts which are essential to the invention are illustrated in FIG. 3 and described hereafter. It contains a PID regulating circuit 50 and a welding current reference element 52 in the form of a store, which contains current nominal values, corresponding to the welding current form, for each chopping interval for comparison with each current actual value determined in each chopping interval. For each welding current form (sine, triangle, trapezium, etc.), the store 52 contains a nominal value table, which is selectable via an input $W_{Tab}$. One output of the store 52 is connected to an input of a multiplier 54. The output of the multiplier 54 is connected to a summing point 56. The summing point 56 connects the input signal received from the multiplier 54 to the current actual value. The output signal of the summing point 56 which is formed by nominal-actual comparison is applied to the input of the PID regulating circuit 50.

The PID regulating circuit 50 delivers at its output a setting signal to one input of a summing point 58. A further output of the store 52 is connected via a feed-forward or forward drive loop 60 to a further input of the summing point 58. Via the feed-forward loop, the store delivers to the summing point 58 the change from the actual current nominal value, which is delivered to the multiplier 54, to the next nominal value, i.e. the first derivative dI/dt or increase of the welding current curve in the actual current nominal value in the direction of the next current nominal value. This directional data is interconnected with the output signal of the PID regulating circuit 50, so that the output signal of the summing point 58 constitutes a setting signal, with which the welding current can be set in the correct direction and proportioning, so that there is no overshoot in the process of regulating the current.

Figure 7A:
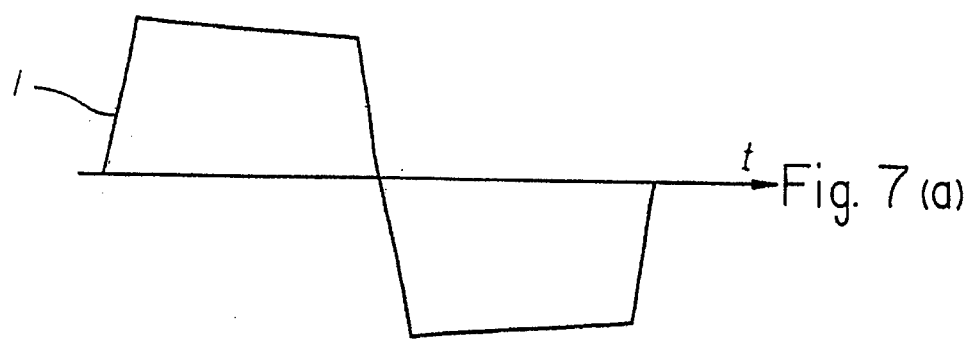
FIGS. 7a–7c show various developments of a preselectable trapezoidal welding current with an inclined impulse top.
Figure 7B:
Figure 7C:
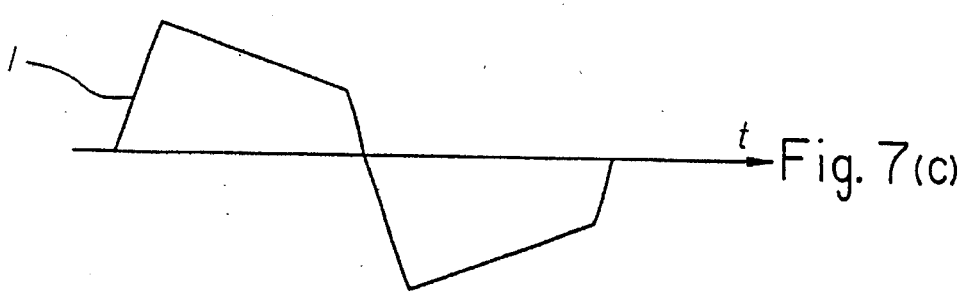
Figure 8A:
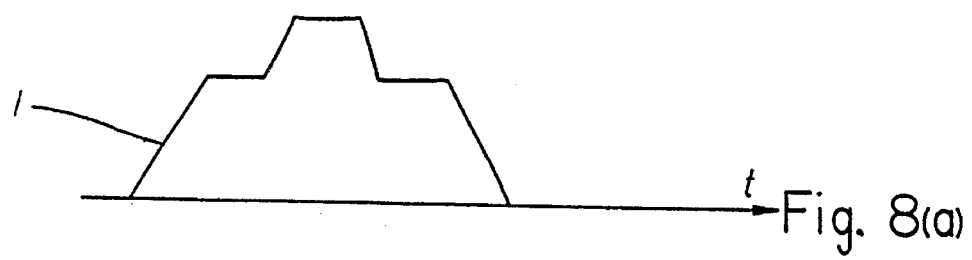
FIGS. 8a–8c show various examples of a preselectable trapezoidal welding current whose impulse top has one or more humps.
Figure 8B:
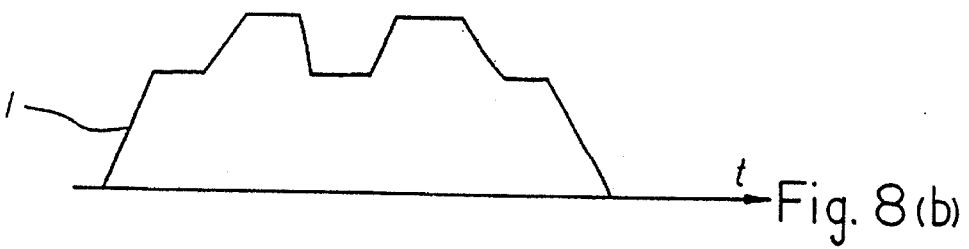
Figure 8C:
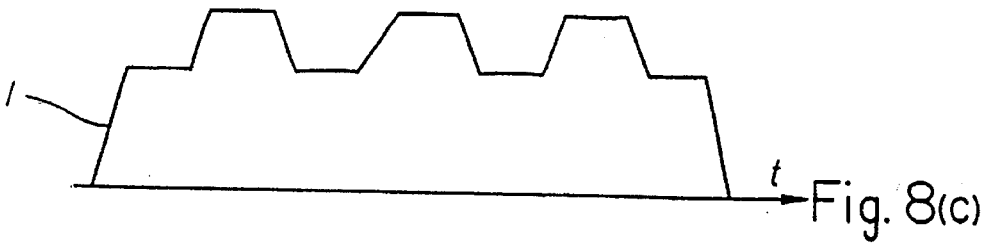
Figure 9A:
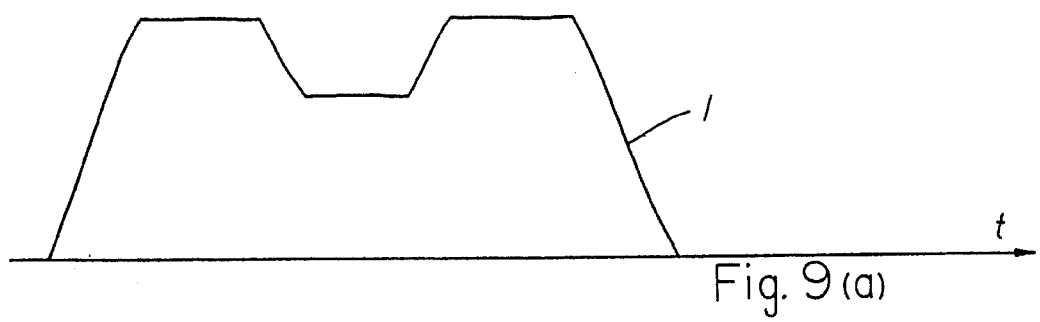
FIGS. 9a–9c show various examples of a preselectable trapezoidal welding current whose impulse top has one or more dips.
Figure 9B:
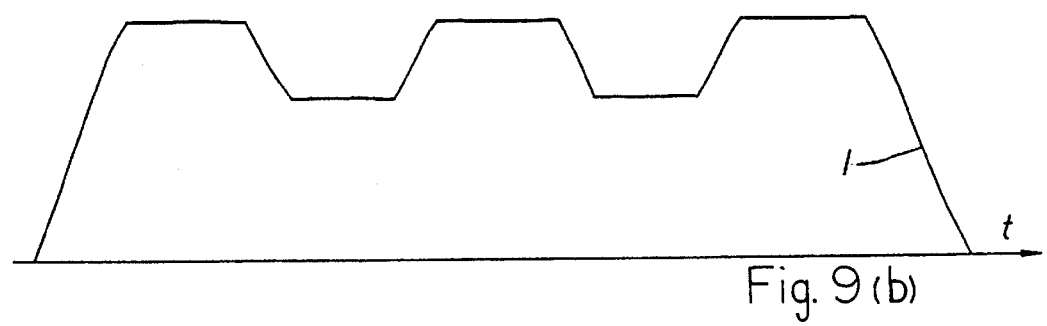
Figure 9C:
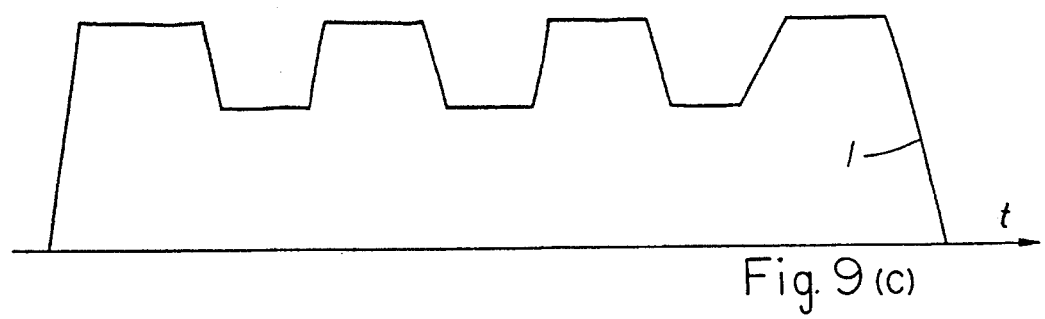

Inside the nominal value table which is coordinated with each welding current form a sub-table is also selectable specially for each welding frequency $f_S$, which is described further in greater detail below. The nominal values of the current curve selected by means of the input signal $W_{Tab}$ and also its first derivative are stored in each nominal value table. For each measuring and chopping interval, the corresponding nominal values from the table are multiplied by the value of desired current amplitude in the multiplier 54 and then fed as a nominal value to the summing point 56. The desired current amplitude is fed as a signal $I_{Soll}$ via the A/D converter 25 into the multiplier 54 and multiplied in it by the current nominal value from the storage means or store 52. The desired current amplitude $I_{Soll}$ can also be influenced alternatively or additionally via the MANUAL input or from the welding machine control system 19 (FIG. 1), for example, in order to give the welding current I a certain course within one welding spot, and therefore within one half-wave of the primary alternating voltage, e.g. to incline the impulse top more and more, as is shown in FIGS. 7a–7c, or to provide it with more or fewer humps or dips, as shown in FIGS. 8a–8c or 9a–9c.

As mentioned heretofore, the store 52 contains for each current form a nominal value table, in the exemplified embodiment illustrated, four nominal value tables. In each table, the desired welding current form is stored by several current nominal values fixed in advance. In the present example, 256 nominal values are stored per period of the welding current. With a welding frequency of 500 Hz and a chopping frequency of 10 kHz, 10 chopping or switching intervals of 100 µs are available respectively per half-wave. The welding current can thus be chopped 10 times per half-wave, i.e. switched on and off ten times. Of the 256 available welding current nominal values, 20 welding current nominal values are therefore selected per period, that is to say, 10 nominal values per half-wave, and are requisitioned for the nominal-actual value comparison in the regulator 18. If the welding frequency were only to reach 50 Hz, 200 nominal values could be selected per period of the welding current, and therefore 100 nominal values per half-wave. According to the welding frequency $f_S$ selected, the appropriate sub-table in the nominal value table corresponding to the welding current form is selected, via the A/D converter 27.

In the nominal value table are also stored the variations from one welding current nominal value to the next, i.e. the dI/dt values within the series of 256 preset welding current nominal values. If working with a welding frequency of between 35 and 40 Hz, all 256 points in the nominal-actual value comparison would be used. Normally, however, a welding frequency of 500 Hz is employed, so that only 20 spots per period of the welding current are used in the nominal-actual value comparison. If, therefore, instead of the nominal value table with the 256 nominal values, a sub-table for a higher welding frequency of over $f_S$ is selected, the computer automatically adapts the changes to it, so that the changes correspond to the selected stepping between the welding current nominal values. Another possibility would be that of not presetting nominal value tables with 256 points per welding current period from the outset and then selecting sub-tables with fewer welding current nominal values, but of calculating these sub-tables in advance and making them selectable as nominal value tables in the storage means 52 together with the changes from nominal value to nominal value.

The nominal current value delivered by the store 52 corresponds exactly to the desired welding current form, but not yet to the desired amplitude. The latter, as explained, is fixed by a separate factor which can be fed into the multiplier 54 via the further three inputs described above.

The regulating procedure operates as follows: With reference to the examples cited above, it is assumed that the work is to take place with a welding frequency $f_S$ of 500 Hz and with a chopping frequency of 10 kHz. The welding current I has a sine form and is obtained by pulse length modulation of the primary alternating voltage U in the manner illustrated in FIG. 4. The nominal value table contains 10 nominal values per half-wave for the welding current I. The smoothed direct current voltage, which is delivered by the direct current intermediate circuit 14c, is chopped at 10 kHz, so that the welding current curve which corresponds to the current nominal values is produced. The measurement frequency with which the actual value of the welding current is determined from the current transformer 20 is equal to the chopping frequency. A welding current actual value is therefore measured for each welding current nominal value. In each nominal-actual value comparison it is determined whether the measured actual value is equal to the nominal value of the welding current which is present in the nominal value table. If this is not the case, the summing point 56 and the PID regulating circuit 50 deliver an error signal, from which a setting signal for the duty ratio is formed by means of the feed-forward signal in the manner described above. With this setting signal an influence is exerted on the duty ratio in such a way, i.e. the ratio between impulse duration and impulse interval during the pulse length modulation of the primary alternating voltage is modified in such a way that the difference between welding current actual value and welding current nominal value is removed.

Thus, the welding current can be readjusted within one half-wave of the welding current, i.e. within one welding spot, in an extremely short regulating time. A further special advantage of this regulating method is that, in addition, each desired current form can be stored as a nominal value table and selected as required. The welding current form is freely selectable within certain limits, which are really only set by the machine (e.g. if there is a maximum possible increase of the welding current curve, which cannot be exceeded because of the existing physical factors, etc.).

In the so-called full sine welding of can bodies between upper and lower welding rolls, as with the welding electrodes 10 and 12 illustrated here, the heating-up distance over the total contacting length between welding rolls and sheet metal is divided into six phases, in which these phases result from a welding speed of 60 m/min and 500 Hz welding frequency and also from a total contact length of 3 mm and produce three half-waves, which phases are divided into three cold and three hot periods (see "Soudronic" Company Journal, 1st year of publication, No. 1, June 1985, Page 3). The production of each welding spot between the welding rolls consequently consists of a triple alternating action between heating-up and cooling. The regulating method according to the invention permits the optimal control of the heating-up and cooling-down phases within one welding spot. FIGS. 7–9 show suitable welding current forms for this. Adaptation to the welding behaviour of different materials is thus possible with the invention. Metal sheets,.which up to now have been weldable only with spatter, can now be welded well with flat welding current impulses without current peaks.

Figure 10:
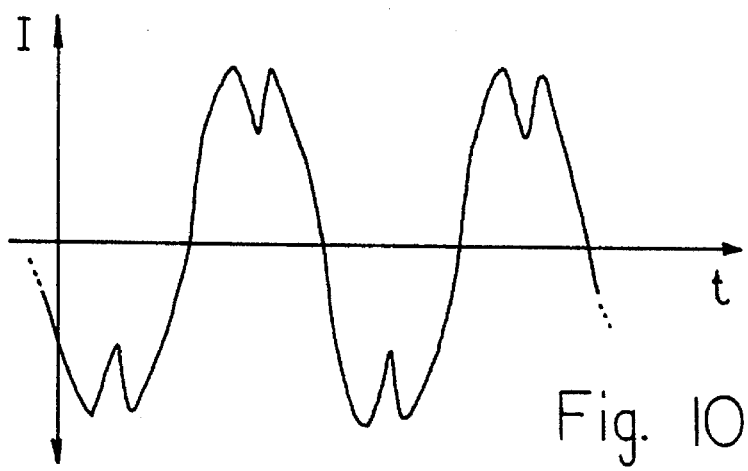

FIG. 10 shows a current course form in which the welding current initially increases sinusoidally in each half-wave, but decreases and increases again before the sine vertex is reached and thereafter decreases towards the zero crossing. With this specific embodiment of the invention, a very good purposive influence on the welding spot formation heat (no fluid phase) is obtained. In roll seam welding it is possible to work, for example, with a welding frequency of 500 Hz, a welding current of 3700 A and a welding speed of 60 m/min, with very good results even with sheet metal qualities which have usually been difficult to control.

Figure 11:
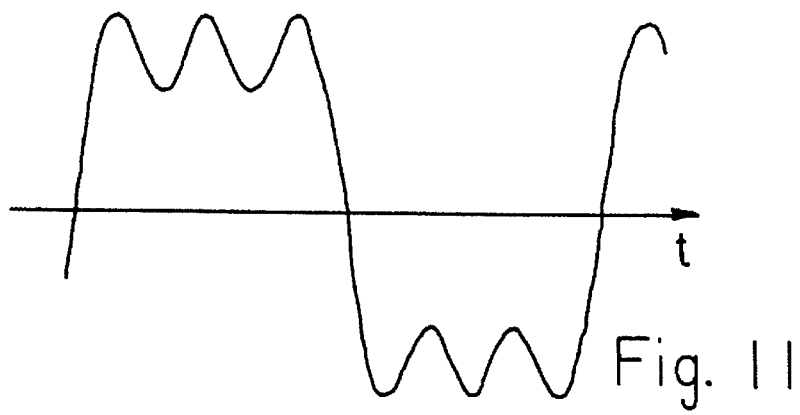
Figure 12:
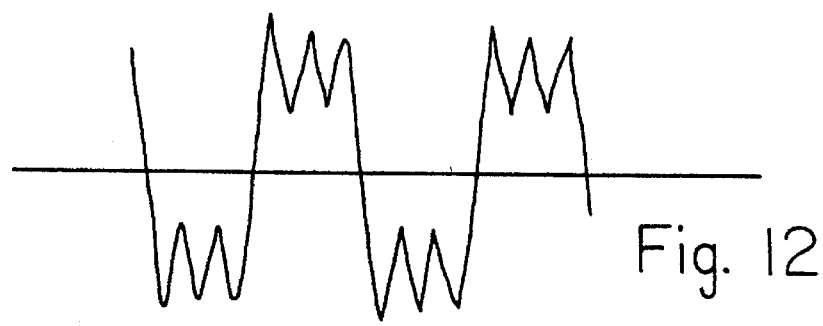

FIGS. 11 and 12 show further preferred current profiles with a repeated decrease of the welding current in the centre of the half-wave; FIG. 11 with an initially sinusoidal increase from the zero crossing; FIG. 12 with a linear increase to a first amplitude peak which lies higher than the two succeeding peaks. With these current profiles, maximum welding speeds can be obtained with a low welding frequency, which prevents excessive heating of the welding plant and produces small energy losses. For example, frequency 250 Hz, current 3780 A, speed 60 m/min can be specified for the roll seam welding.

Figure 13:
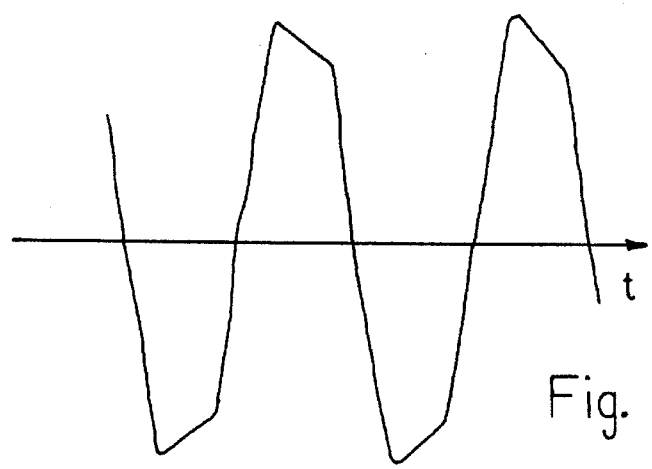

FIG. 13 shows a preferred current profile with a gently decreasing current course in the middle of each half-wave in each instance. A larger welding range (between adhesion and spatter limits) can be achieved with this courser depending upon sheet metal quality.

Figure 14:
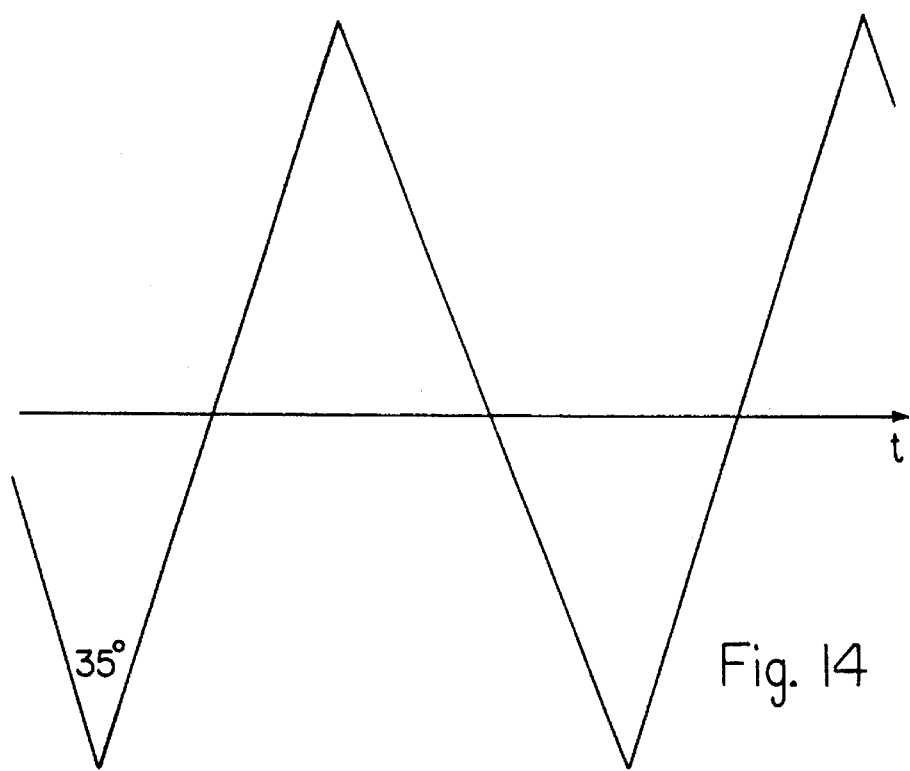

FIG. 14 shows a triangular course of the current. Here, advantages particularly in the welding of unconventionally coated (not tin-plated) metal sheets can be obtained.

Figure 15:
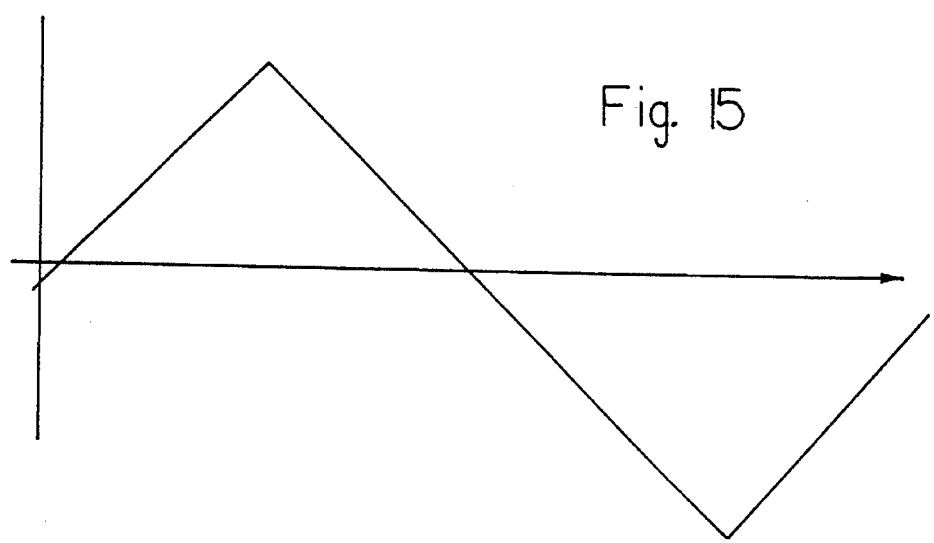

FIG. 15 shows a similar current profile with a slower energy supply to the material being welded.

Figure 16:
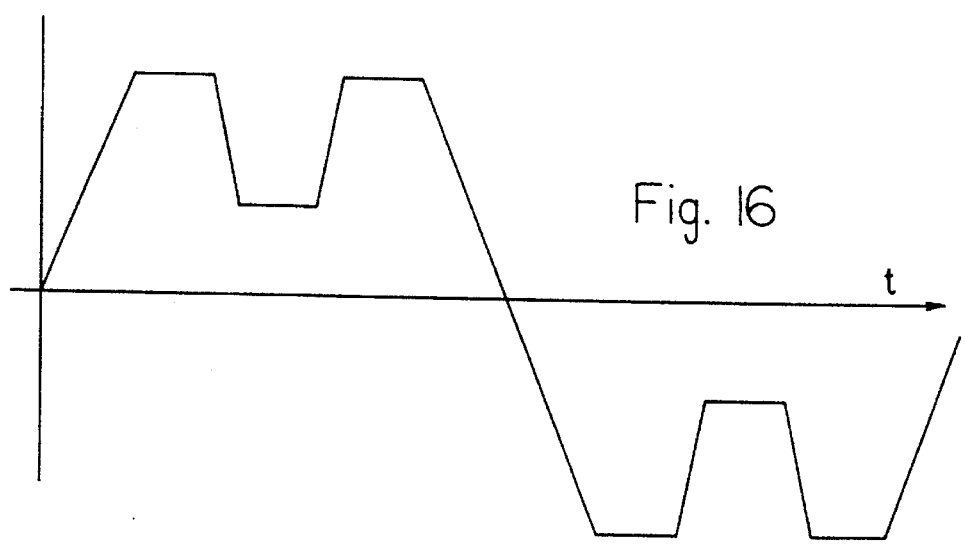
Figure 17:
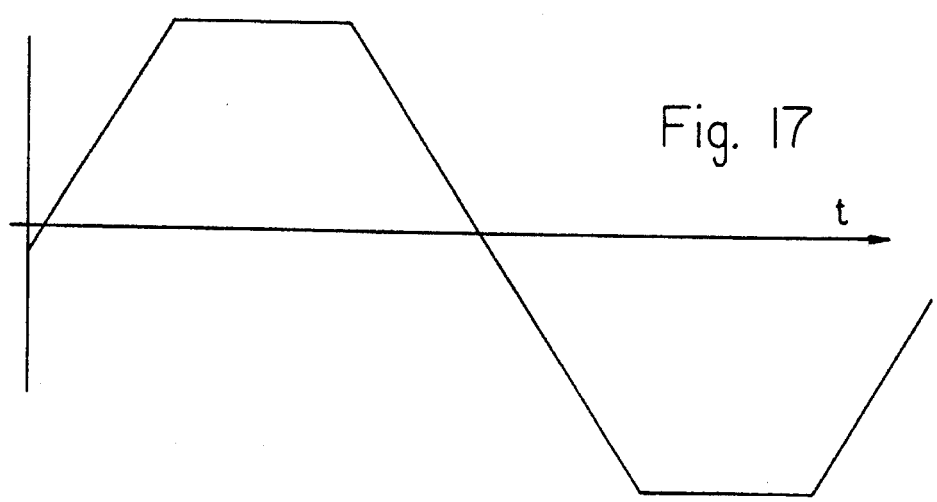
Figure 18:
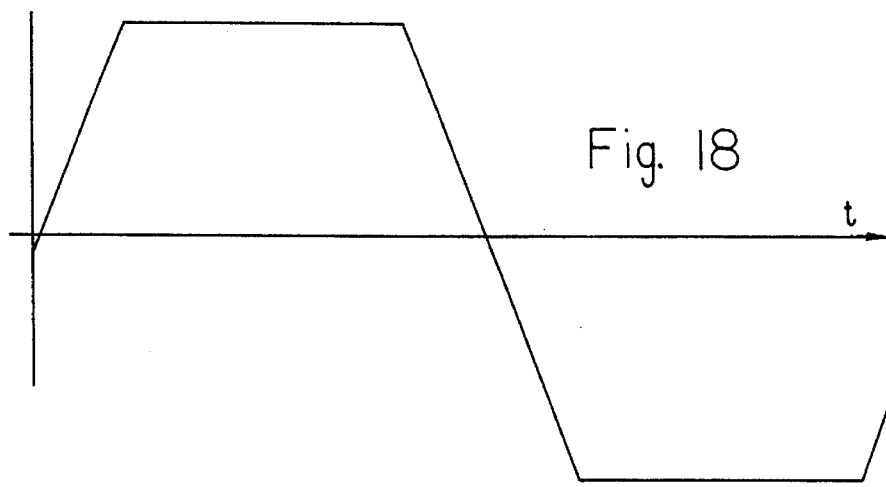
Figure 19:
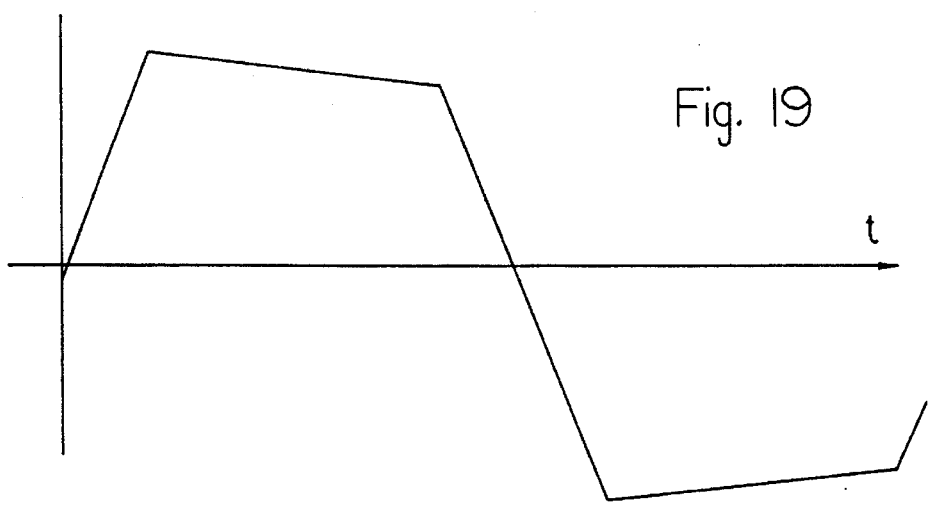
Figure 20:
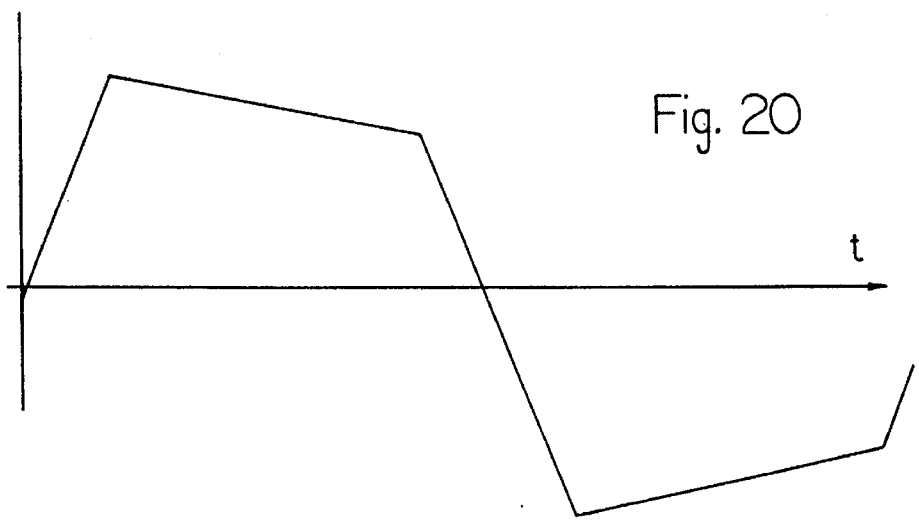
Figure 21:
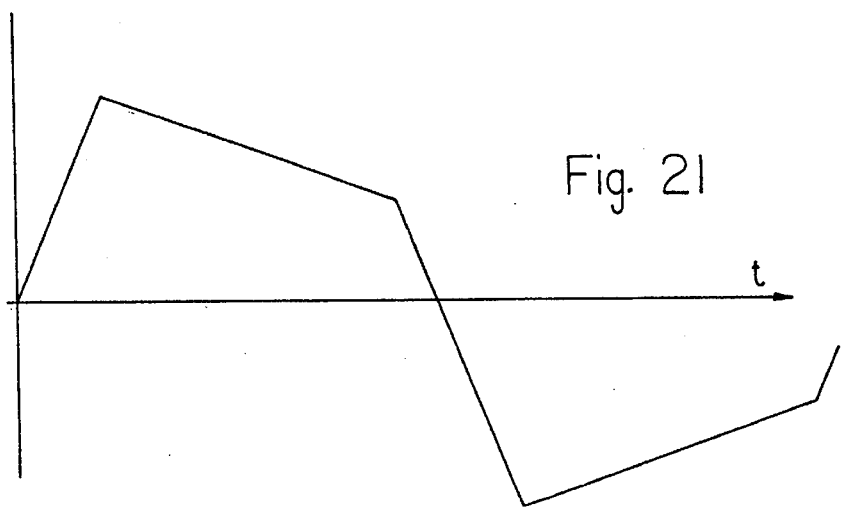
Figure 22:
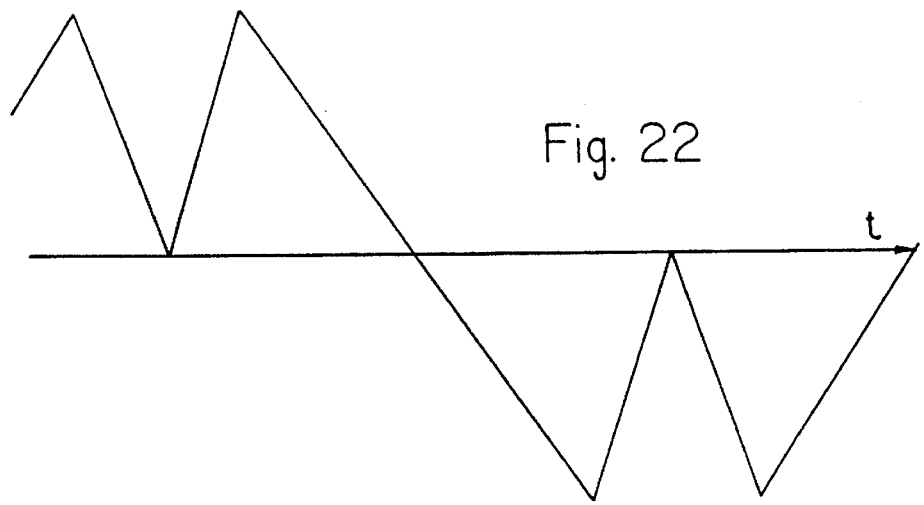
Figure 23:
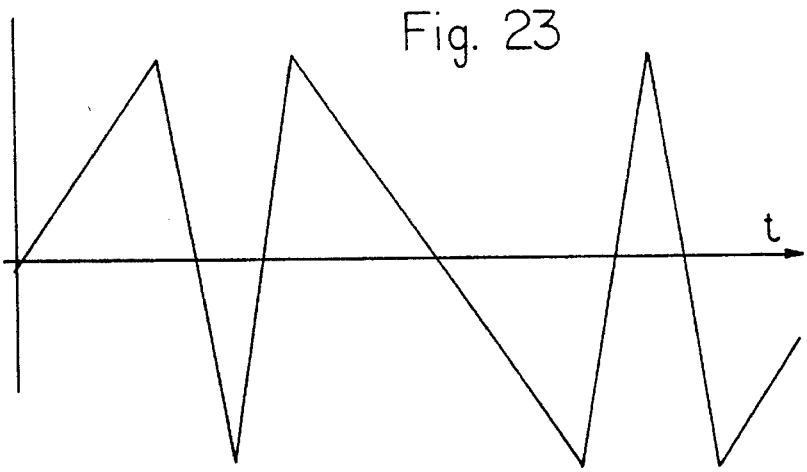
Figure 24:
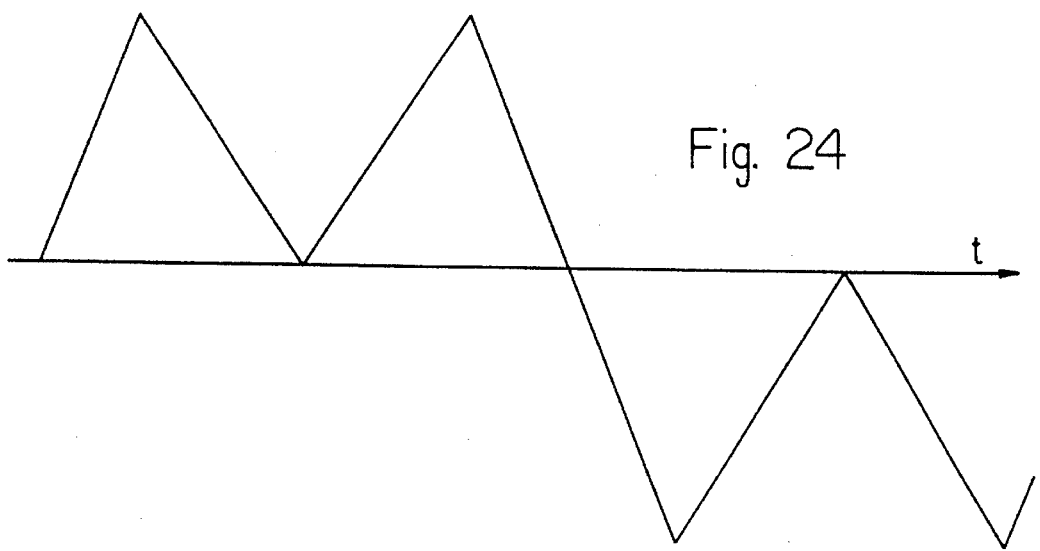
Figure 25:
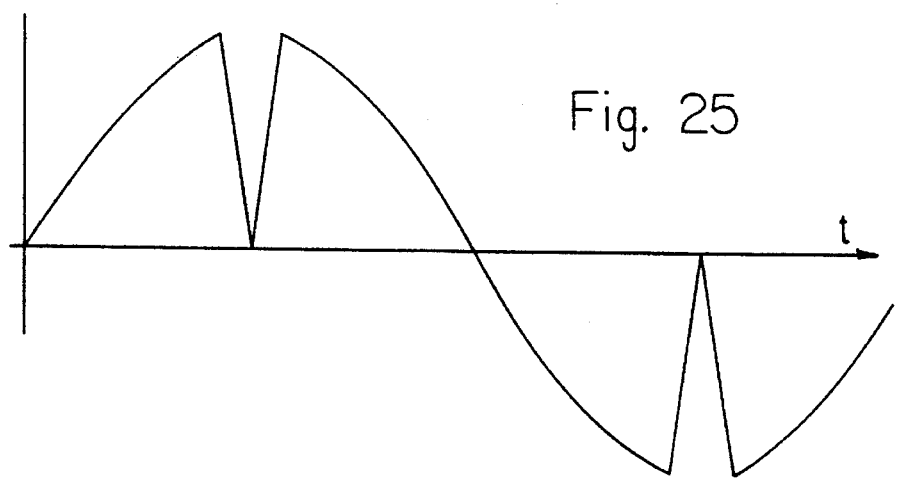
Figure 26:
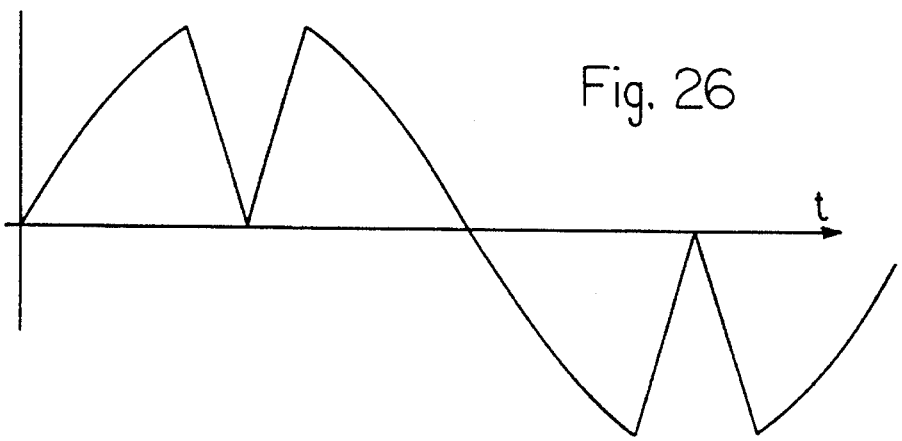
Figure 27:
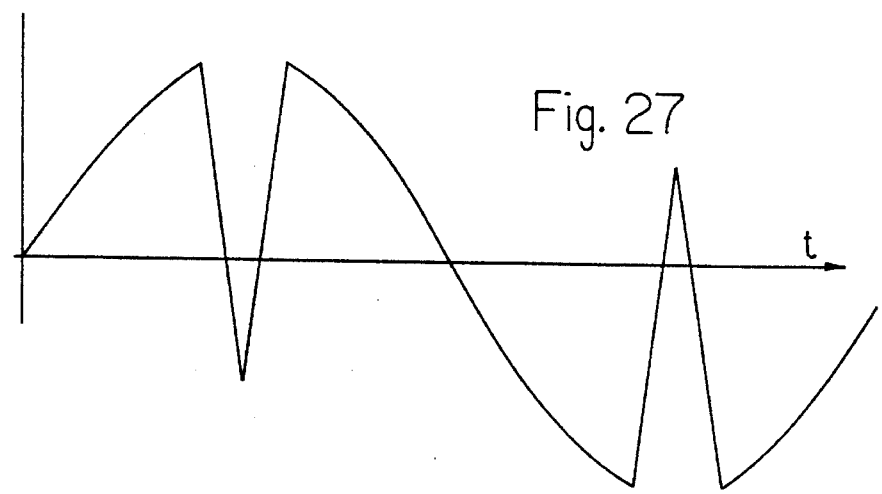
Figure 28:
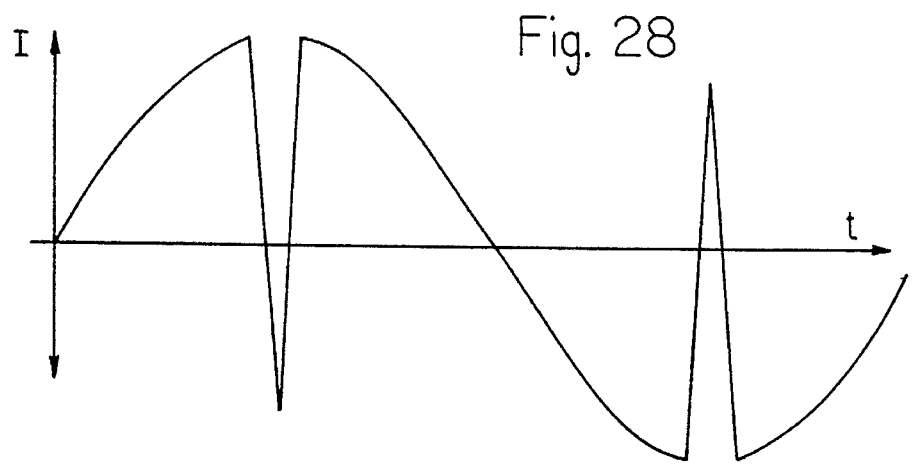

FIGS. 16 to 18 show current profiles in which the welding current is kept constant for certain periods within the half-wave in each instance. In the case of special welds, this results in a particularly good energy supply to the welding zone.

FIGS. 22–29 show current profiles in which the energy supply is sharply reduced during the half-wave, by reducing the current to the zero value, or in which the current is reversed for a short period during the half-wave in each instance.

FIG. 30 shows a current profile with constant portions, in which the first constant section has a higher amplitude than the succeeding sections.

The current forms shown and further current forms can be created with the arrangement described above. The output stage 14b is connected to the primary circuit of a welding current transformer 16, to which it transmits a primary alternating voltage $U_p$. The secondary circuit of the welding transformer 16 is connected to the welding electronics 10 and 12.

According to the expanded diagram in FIG. 12, the input stage 14a of the static frequency changer 14 has a three-phased rectifier, which at the same time forms the input of the direct current intermediate circuit 14c which is generally known and does not need to be described in greater detail here as it is unimportant for the circumstances of the invention as FIG. 12 shows, the chopper in the output stage 14b of the frequency changer 14 (FIG. 11) contains a bridge circuit with transistors $T_1$–$T_4$ as circuit elements and freewheel diodes $F_1$–$F_4$ in parallel with the transistors. Four gate drivers are connected to the transistors and freewheel diodes in the manner illustrated in FIG. 12 and are controlled by a regulator 18 (FIG. 11.) via lines 15. In the primary circuit of the welding transformer 16 is arranged a current transformer 20, which detects the actual value of the current flowing in the primary circuit of the welding transformer 16.

According to the diagram in FIG. 11, the current actual value from the current transformer 20 is transmitted via an A/D converter 22 to an input of the regulator 18 which is designed as a process computer. At the regulator 18, nominal values $I_{Soll}$ for the welding current or $f_s$ for the welding frequency are settable via poteniometers 24 and 26. The analogue voltages set at the potentiometers 24 and 26 are applied to the process computer via A/D convertors 25 or 27. In addition, a welding current supply magnitude $I_F$ can be fed into the regulator 18 via an input indicated with manual or via a welding machine control system 19. This magnitude is linked with the nominal welding current $I_{Soll}$, in order, for example, to allow for the fact that the current is not constant over one can body. Thus, the welding machine control system 19, which knows where the welded can body is at each point in time, can also vary the set nominal value $I_{Soll}$ accordingly so that welding can occur at each point of the can body with a suitable welding current amplitude. The regulator 18 determines through a nominal actual value comparison of the welding current a setting value, which it transmits via an A/D convertor 28 and the lines 15 to the gate drives (FIG. 12) in the output stage 14b of the frequency changer 14 (FIG. 11). The setting value influences the duty ratio of the rectangular impulses into which the chopper in the output stage 14b chops the smoothed direct current from the direct current intermediate circuit 14c in each half-wave, in order thus to regulate the welding current by pulse length modulation of the primary alternating voltage with that affected duty ratio, as is described in greater detail hereafter with reference to FIG. 13.

Various ways of generating the primary alternating voltage by chopping the smoothed direct current voltage into rectangular impulses are illustrated in FIGS. 14 to 30.

The regulator 18 is illustrated more fully in FIG. 13. The regulator 18, is as already mentioned above, designed as a process computer, of which only the parts essential to the invention are illustrated in FIG. 13 and described hereafter. It contains a PID regulating circuit 50 and a welding current reference element 52 in the form of a store, which contains a current nominal values, corresponding to the welding current form for each chopping interval for comparing with each current actual value ascertained in each chopping interval. For each welding current form (sine, triangle, trapezium etc.) the store 52 contains a nominal value table, which is selectable via an input $W_{Tab}$. One output of the store 52 is connected to one input of a multiplier 54. The output of the multiplier 54 is connected to a summing point 56. The summing point 56 interconnects the input signal received from the multiplier 54 to the current actual value. The output signal of the summing point 56 which is formed by nominal-actual value comparison is applied to the input of the PID regulating circuit 50.

The PID regulating circuit 50 delivers at its output a setting signal to one input of a summing point 58. A further output of the store 52 is connected via a feed-forward or forward drive loop 60 to a further input of the summing point 58. Via the feed-forward loop, the store delivers to the summing point 58 the change from the actual current nominal value, which is delivered to the multiplier 54, to the next nominal value, i.e. the first derivative DI/Dt or increase of the welding current curve in the actual current nominal value in the direction of the next current nominal value. This directional data is interconnected with the output signal of the PID regulating circuit 50, so that the output signal of the summing point 58 represents a setting signal with which the welding current can be set in the correct direction and proportioning, so that there is no overshoot in the process of regulating the current.

Figure 29:
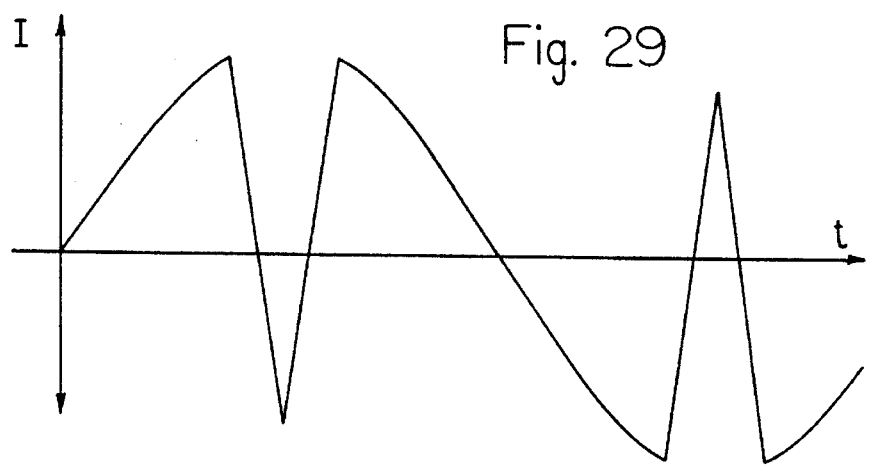

Inside the nominal value table coordinated with each welding current profile another sub-table is selectable specially for each welding frequency $f_s$, which is described in greater detail below. The nominal values of the current curve selected by means of the input signal $W_{Tab}$ and also its first derivative are stored in each nominal value table. For each measuring and chopping interval the corresponding nominal values from the table are multiplied by the value of the desired current amplitude in the multiplier 54 and then fed to the summing point 56 as a nominal value. The desired current amplitude is transmitted as a signal $I_{Soll}$ via the A/D convertor 25 to the multiplier 54 and is multiplied there by the current nominal value from the store 52. The desired current amplitude $I_{Soll}$ can also be alternatively or additionally influenced by the MANUAL input or by the welding machine control system 19 (FIG. 11), for example, in order to give the welding current I a certain course within one welding point, and therefore within one half-wave of the primary alternating voltage e.g. to incline the impulse top more and more, as shown in FIGS. 29 to 31, or provide it with more or fewer humps or dips.

As already mentioned heretofore, the store 52 contains for each current profile a nominal value table, in the exemplified embodiment illustrated, four nominal value tables. The desired welding current profile is stored in each table through several current nominal values fixed in advance. In the present, example 256 nominal are stored per welding current period. With a welding frequency of 500 Hz and a chopping frequency of 10 kHz, 10 chopping or switching intervals each of 100 μs are available per half-wave. The welding current can therefore be chopped ten time per half-wave, i.e. switched on and off ten times. Of the 256 available welding current nominal values, 20 welding current nominal values are therefore selected per period, that is to say 10 nominal values per half-wave, and requisitioned for the nominal-actual value comparison in the regulator 18. If the welding frequency were to be only 50 Hz, 200 nominal values could be selected per welding current period, and therefore 100 nominal values per half-wave According to the welding frequency $f_{s\ selected}$, the appropriate sub-table in the nominal value table corresponding to the welding current profile is selected via the A/D convertor 27. In the nominal value table are also stored the variations from one welding current nominal value to the next, i.e. the dI/dt values within the series of 256 preset welding current nominal values. If working with a welding frequency of between 35 and 40 Hz, all 256 points would be used in the nominal-actual value comparison.

Normally, however, a welding frequency of 500 Hz is employed, so that only 20 points per welding current period are used in the nominal-actual value comparison. If, therefore, instead of the nominal value table with the 256 nominal values, a sub-table for a higher welding frequency of over $f_s$ is selected, the computer automatically adapts the changes to it, so that the changes correspond to the selected stepping between the welding current nominal values. Another possibility would be that of not presetting nominal value tables with 256 points per welding current period from the outset and then selecting sub-tables with fewer welding current nominal values, but of calculating these sub-tables in advance and making them selectable as nominal value tables in the store 52, together with the changes from nominal value to nominal value. The nominal current value delivered by the store 52 corresponds exactly to the desired welding current form, but not yet to the desired amplitude. The latter, as explained, is fixed by a separate factor which can be fed into the multiplier 54 via the further three inputs described above.

The regulating procedure operates as follows: with reference to the example cited above, it is assumed that the work is to take place with a welding frequency $f_s$ of 500 Hz and with a chopping frequency of 10 kHz. The welding current I has a sine form and is obtained by pulse length modulation of the primary alternating voltage U in the manner illustrated if FIG. 14. The nominal value table contains 10 nominal values per half-wave for the welding current I. The smoothed direct current voltage, which is delivered by the direct current intermediate circuit 14c, is chopped at 10 kHz, so that the welding current curve which corresponds to the current nominal values is produced. The measurement frequency with which the actual value of the welding current is determined from the current transformer 20 is equal to the chopping frequency. A welding current actual value is therefore measured for each welding current nominal value. In each nominal-actual value comparison it is determined whether the actual value measured is equal to the nominal value of the welding current which is preset in the nominal value table. If this is not the case, the summing point 56 and the PID regulating circuit 50 deliver an error signal, from which a setting signal for the duty ratio is formed by means of the feed-forward signal in the manner described above. With this setting signal an influence is exerted on the duty ratio in such a way, i.e. the ratio between impulse length and impulse interval during the pulse length modulation of the primary alternating voltage is modified in such a way that the difference between welding current actual value and welding current nominal value is removed.

Thus, the welding current can be readjusted within one half-wave of the welding current, i.e. within one welding spot, in an extremely short regulating time. A further special advantage of this regulating method is that, in addition, each desired current profile can be stored as a nominal value table and selected as required. The welding current form is freely selectable within certain limits, which are really only set by the machine (e.g. if there is a maximum possible increase of the welding current curve, which cannot be exceeded because of the existing physical factors, etc.).

In the so-called full sine welding of can bodies between upper and lower welding rolls, as with the welding electrodes 10 and 12 illustrated here, the heating-up distance over the total contacting length between welding rolls and sheet metal is divided into six phases, in which these phases result from a welding speed of 60 m/min and 500 Hz welding frequency and also from a total contact length of 3 mm and produce three half-waves, which phases are divided into three cold and three hot periods (see "Soudronic" Company Journal, 1st year of publication, No. 1 June 1985, Page 3). The production of each welding spot between the welding rolls consequently consists of a triple alternating action between heating-up and cooling. The regulating method according to the invention permits the optimal control of the heating-up and cooling-down phases one welding spot. Adaption to the welding behaviour of different materials is thus possible with the invention. Metal sheets, which up to now have been weldable only with spatter, can now be welded well with flat welding current impulses having no current peaks.

We claim:

1. Process for resistance welding with a welding current which pulsates in periodic half-waves and which is generated from a primary alternating voltage and is controlled by pulse length modulation thereof, characterized in that the primary alternating voltage during the pulse length modulation is chopped in each half-wave with a chopping frequency and wherein the welding current is controlled within the half-wave on the basis of a nominal-actual value comparison by influencing the duty ratio in accordance with the pulse length modulation, and said chopping frequency is n-times the welding current frequency, n being a number greater than 1, and wherein a sequence of welding current nominal values is provided to define the form of each half-wave, and in each half-wave n nominal-actual comparisons of the welding current are performed and in each half-wave the duty ratio is influenced n times.

2. Process as claimed in claim 1, characterized in that the chopping frequency is selected to be 20 times the welding frequency.

3. Process as claimed in any one of claim 1, characterized in that the form of welding current can be preselected by means of a nominal value table.

4. Process for resistance-welding with a welding current pulsating in periodic half-waves which current is generated from a primary alternating voltage, characterized in that the primary alternating voltage is chopped into pulses in each half-wave with a chopping frequency which is a multiple of the welding current frequency, and the pulses are pulse width modulated in order to produce a particular welding current which deviates from a sinusoidal profile and wherein the welding current is controlled within the half-wave on the basis of a nominal-actual value comparison, by influencing the duty ratio in accordance with the pulse width modulation, and wherein said chopping frequency is n-times the welding current frequency, n being a number greater than 1, and wherein a sequence of welding current nominal values is provided to define the form of each half-wave, and wherein in each half-wave n nominal-actual comparisons of the welding current are performed and in each half-wave the duty ratio is influenced n times.

5. Process as claimed in claim 4, characterized in that the welding current, after a zero crossing, initially increases generally sinusoidally, decreases before the sine peak value is reached, and increases again, and thereafter decreases generally sinusoidally towards a zero crossing.

6. Process as claimed in claim 5, characterized in that the decrease in the current within the half-wave occurs up to the zero value.

7. Process as claimed in claim 5, characterized in that the decrease in the current within the half-wave occurs below the zero value of the current.

8. Process as claimed in claim 4, characterized in that the welding current, after a zero crossing, initially increases generally sinusoidally, and thereafter repeatedly adopts a decreasing and then increasing course, and thereafter generally decreases sinusoidally towards a zero crossing.

9. Process as claimed in claim 8, characterized in that the welding current follows a course which decreases and increases twice between the generally sinusoidal sections.

10. Process as claimed in claim 4, characterized in that the course of the welding current at first increases steeply, then decreases gently and then decreases steeply.

11. Process as claimed in claim 4, characterized in that the welding current increases generally linearly from a zero crossing, repeatedly decreases and increases again in the area of the peak value of the half-wave, and thereafter decreases generally linearly towards a zero crossing.

12. Process as claimed in claim 11, characterized in that the course of the welding current decreases and increases twice between the generally linear sections.

13. Process as claimed in claim 4, characterized in that the welding current has a triangular form.

14. Process as claimed in claim 4, characterized in that the welding current has a trapezoidal form.

15. Process as claimed in claim 14, characterized in that a further trapezoidal current variation occurs between the shoulders of a longer trapezoidal form.

16. Process as claimed in claim 14, characterized in that a plurality of similar trapezoidal current variations occur between the shoulders of a longer trapezoidal form.

17. Process as claimed in claim 16, characterized in that the trapezoidal current variation has a horizontal section higher than that of the or each succeeding variation of said plurality of variations.

18. Process as claimed in claim 4, characterized in that the welding current initially increases generally linearly, thereafter decreases generally linearly and subsequently increases, and thereafter decreases generally linearly again.

19. Process as claimed in claim 18, characterized in that the decrease in the current within the half-wave mainly occurs at the zero value of the current.

20. Process as claimed in claim 18, characterized in that the decrease in the current within the half-wave occurs below the zero value of the current.

21. Process as claimed in claim 4, characterized in that the welding frequency is 500 Hz or 250 Hz.

22. An arrangement for controlling the welding current in a resistance welding machine having a static frequency changer for generating a primary alternating voltage supplied to a welding transformer with the secondary circuit of the transformer connected to the welding electrodes of the machine, comprising:
   a chopper in the frequency changer for chopping each half-wave of the primary alternating voltage into a series of pulses; and
   control means connected with the chopper for controlling the pulses and welding current generated in each half-wave of the primary alternating voltage, the control means including a regulator which is connected to the chopper of the frequency changer for controlling the welding current by pulse length modulation of the primary alternating voltage, the control means having a welding current reference element including storage means for storing an ordered sequence of nominal current values corresponding to the form of welding current in each interval of the chopper voltage for comparing with each actual current value which is determined for each chopping interval.

23. Arrangement for controlling the welding current in a resistance welding machine, comprising:
   a static frequency changer which generates the primary alternating voltage (Up) and transmits it to a welding transformer whose secondary circuit is connected to welding electrodes of a resistance welding machine, the static frequency changer including a direct current intermediate circuit and a chopper as an output stage;
   a control device by means of which the chopper can be controlled for the multiple chopping of each half-wave of the primary alternating voltage, said control means having a welding current reference element including storage means in which a sequence of nominal current values corresponding to the form of welding current in each interval of the chopper voltage is stored for comparing with each actual current value which is determined for each chopping interval; and
   a comparator for comparing said actual current value with said nominal current value n-times within each half-wave of said welding current.

24. An arrangement for controlling the welding current in a resistance welding machine having a static frequency changer for generating a primary alternating voltage supplied to a welding transformer with the secondary circuit of the transformer connected to the welding electrodes of the machine, comprising:
   a chopper in the frequency changer for chopping each half-wave of the primary alternating voltage into a series of pulses; and
   control means connected with the chopper for controlling the pulses and welding current generated in each half-wave of the primary alternating voltage, the control means including a regulator which is connected to the chopper of the frequency changer for controlling the welding current by pulse length modulation of the primary alternating voltage, the control means having a welding current reference element including storage means which contains nominal current values corresponding to the form of welding current in each interval of the chopper voltage for comparing with each actual current value which is determined for each chopping interval.

25. Arrangement as claimed in claim 24, characterized in that the chopper of the frequency changer contains a bridge circuit with transistors ($T_1$–$T_4$) as circuit elements and free-wheel diodes ($F_1$–$F_4$) parallel to the latter.

26. Arrangement as claimed in claim 24, characterized in that a nominal value table, which is selectable via an input ($W_{Tab}$), is available in the store for each desired form of welding current.

27. Arrangement as claimed in claim 26, characterized in that a sub-table is selectable via an adjustable welding frequency input for each welding frequency ($f_S$) in each nominal value table in the store (52).

28. Arrangement as claimed in claim 26, characterized in that a nominal value table corresponding to the desired form of welding current is available for each welding frequency in the storage means.

29. Arrangement as claimed in claim 26, in which the regulator contains a PID regulating circuit, which is provided with a feed forward loop, characterized in that for each current nominal value in the table, the change to the following current nominal value is stored and supplied to the output of the PID regulating circuit (50) as a feed-forward value.

30. Arrangement as claimed in claim 24, characterized in that the storage means, has a multiplier is connected to it which multiplies the table nominal value by a selectable factor which can be input via an adjustable current nominal value input ($I_{Soll}$) of the regulator.

31. Arrangement as claimed in claim 30, characterized in that the multiplier has further inputs, via which further factors can be input manually or from a superposed welding machine control system.

* * * * *